US009670035B2

(12) United States Patent
Orelup et al.

(10) Patent No.: US 9,670,035 B2
(45) Date of Patent: Jun. 6, 2017

(54) FIRE-RETARDANT BELT

(75) Inventors: Mark F. Orelup, Torrington, CT (US); Brad Guilani, Woodstock Valley, CT (US); Kathryn Rauss Sherrick, Bristol, CT (US); Amir Lotfi, South Windsor, CT (US); Hong Yang, Avon, CT (US)

(73) Assignee: Otis Elevator Company, Farmington, CT (US)

( * ) Notice: Subject to any disclaimer, the term of this patent is extended or adjusted under 35 U.S.C. 154(b) by 150 days.

(21) Appl. No.: 14/415,444

(22) PCT Filed: Jul. 18, 2012

(86) PCT No.: PCT/US2012/047204
§ 371 (c)(1),
(2), (4) Date: Jan. 16, 2015

(87) PCT Pub. No.: WO2014/014456
PCT Pub. Date: Jan. 23, 2014

(65) Prior Publication Data
US 2015/0191331 A1 Jul. 9, 2015

(51) Int. Cl.
*B66B 7/06* (2006.01)
*D07B 1/16* (2006.01)
*D07B 5/00* (2006.01)
*D07B 1/22* (2006.01)

(52) U.S. Cl.
CPC .............. *B66B 7/062* (2013.01); *D07B 1/162* (2013.01); *D07B 5/00* (2013.01); *D07B 1/22* (2013.01); *D07B 2401/2035* (2013.01); *D07B 2501/2007* (2013.01); *Y10T 428/239* (2015.01)

(58) Field of Classification Search
CPC ....................................................... B66B 7/062
USPC ............................................................ 428/76
See application file for complete search history.

(56) References Cited

U.S. PATENT DOCUMENTS

| 5,119,927 | A  | 6/1992  | Bruggemann      |
| 6,164,053 | A  | 12/2000 | O'Donnell et al.|
| 6,364,063 | B1 | 4/2002  | Aulanko et al.  |
| 6,419,775 | B1 | 7/2002  | Gibson et al.   |
| 6,739,433 | B1 | 5/2004  | Baranda et al.  |
| 7,041,021 | B2 | 5/2006  | Gibson et al.   |
| 7,056,249 | B1 | 6/2006  | Osako et al.    |

(Continued)

FOREIGN PATENT DOCUMENTS

CN 201220837 4/2009
EP 1561719 8/2005

(Continued)

OTHER PUBLICATIONS

CN search report for CN201280074793.0 dated Jan. 29, 2016.

(Continued)

*Primary Examiner* — Brent O'Hern
(74) *Attorney, Agent, or Firm* — O'Shea Getz P.C.

(57) ABSTRACT

A belt and a method for manufacturing a belt is provided. The belt includes a plurality of lengthwise-extending tension members and a jacket. The jacket substantially retains the plurality of tension members. The jacket has a first side region, a second side region, and a center region between the first and second side regions. The first and second side regions of the jacket are more fire retardant than the center region of the jacket.

17 Claims, 5 Drawing Sheets

(56) References Cited

U.S. PATENT DOCUMENTS

| | | |
|---|---|---|
| 7,153,897 B2 | 12/2006 | Tanaka et al. |
| 7,437,869 B1 | 10/2008 | Chou |
| 7,637,549 B2 | 12/2009 | Hess |
| 7,743,596 B1 | 6/2010 | Chou et al. |
| 7,819,767 B2 | 10/2010 | Nishida et al. |
| 7,909,719 B2 | 3/2011 | Leighton et al. |
| 8,007,917 B2 | 8/2011 | Alexander et al. |
| 2011/0100759 A1* | 5/2011 | Yu ............................ B66B 7/062 187/251 |
| 2011/0108372 A1 | 5/2011 | Krishnan et al. |
| 2012/0329591 A1 | 12/2012 | Goeser et al. |

FOREIGN PATENT DOCUMENTS

| | | |
|---|---|---|
| EP | 1153167 | 6/2011 |
| GB | 1012641 | 12/1965 |
| JP | 3071194 | 7/2000 |
| JP | 2002231070 | 8/2002 |
| JP | 4462672 | 5/2010 |
| JP | 2011031572 | 2/2011 |

OTHER PUBLICATIONS

EP search report for EP 12881271.6 dated Jun. 23, 2015.
Metso Minerals "Trellex Heat Resistant Conveyor Belts", http://www.metso.com/miningandconstruction/MaTobox7.nsf/DocsByID/BCF59B8A234835CCC1256B99002A59F0/$File/Heat_Resistant_Conveyor_Belts_EN.pdf, 2002.

\* cited by examiner

FIRE-RETARDANT BELT

This application is entitled to the benefit of, and incorporates by reference essential subject matter disclosed in PCT Application No. PCT/US2012/047204 filed on Jul. 18 2012.

BACKGROUND OF THE INVENTION

1. Technical Field

The present invention relates to belts, and more particularly to fire-retardant belts, for example used in elevator systems.

2. Background Information

Conventional traction elevator systems have included a car, a counterweight, two or more ropes interconnecting the car and the counterweight, and a machine and a traction sheave to move the ropes. The ropes were conventionally formed of steel wires formed into strands, the strands then formed into cords, and the cords then formed into the rope. Although conventional ropes have proven to be very reliable and cost effective, belts have been used in recent years as an alternative to the conventional ropes. Some belts have been designed with a plurality of steel cords covered by a thermoplastic jacket to suspend and/or lift the elevator car. Fire-retardant thermoplastic jacket compositions have been used in order to resist or minimize any burning of the thermoplastic jacket. It has been discovered, however, that even when using fire-retardant thermoplastic jacket compositions, fire spreads more rapidly along an narrow edge or corner of the jacket than along a broad, flat surface of the jacket. What is needed, therefore, is an improved belt directed toward this problem.

SUMMARY OF THE DISCLOSURE

According to an aspect of the invention, a belt is provided. The belt includes a plurality of lengthwise-extending tension members and a jacket. The jacket substantially retains the plurality of tension members. The jacket has a first side region, a second side region, and a center region between the first and second side regions. The first and second side regions of the jacket are more fire retardant than the center region of the jacket.

Alternatively or in addition to this or other aspects of the invention, the jacket further includes a first side surface opposing a second side surface, the first and second side surfaces extending between a first traction surface and a second traction surface.

Alternatively or in addition to this or other aspects of the invention, a widthwise distance between the first and second side surfaces is greater than a heightwise distance between the first and second traction surfaces.

Alternatively or in addition to this or other aspects of the invention, the first side region is contiguous with the first side surface, and the second side region is contiguous with the second side surface.

Alternatively or in addition to this or other aspects of the invention, the first and second side regions of the jacket have a higher concentration of a fire-retardant material than the center region.

Alternatively or in addition to this or other aspects of the invention, the first and second side regions of the jacket each include a first fire-retardant material and the center region of the jacket includes a second fire-retardant material, and wherein the first fire-retardant material is more fire retardant than the second fire-retardant material.

Alternatively or in addition to this or other aspects of the invention, the first and second side regions of the jacket include a greater amount of a fire-retardant material than the center region of the jacket.

Alternatively or in addition to this or other aspects of the invention, the first side region is defined by the first side surface, the first and second traction surfaces, and a first side region boundary that extends between the first and second traction surfaces.

Alternatively or in addition to this or other aspects of the invention, the first side region is defined by a widthwise distance between the first side surface and the first side region boundary.

Alternatively or in addition to this or other aspects of the invention, the first side region is defined by a plurality of widthwise distances between the first side surface and the first side region boundary.

Alternatively or in addition to this or other aspects of the invention, the second side region is defined by the second side surface, the first and second traction surfaces, and a second region boundary that extends between the first and second traction surfaces.

Alternatively or in addition to this or other aspects of the invention, the second side region is defined by a widthwise distance between the second side surface and the second side region boundary.

Alternatively or in addition to this or other aspects of the invention, the second side region is defined by a plurality of widthwise distances between the second side surface and the second side region boundary.

Alternatively or in addition to this or other aspects of the invention, the jacket includes one or more woven fibers.

Alternatively or in addition to this or other aspects of the invention, the one or more woven fibers of the jacket have fire-retardant properties.

Alternatively or in addition to this or other aspects of the invention, a fire-retardant material is applied to the one or more woven fibers of the jacket.

Alternatively or in addition to this or other aspects of the invention, the jacket defines at least one blunt edge.

Alternatively or in addition to this or other aspects of the invention, the jacket is at least partially arcuately-shaped.

According to an aspect of the invention, a method for manufacturing a belt is provided. The method includes the steps of: (1) providing a plurality of lengthwise-extending tension members; and (2) covering the plurality of tension members with a jacket. The jacket has a first side region, a second side region, and a center region extending between the first and second side regions. The first and second side regions of the jacket are more fire retardant than the center region of the jacket.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
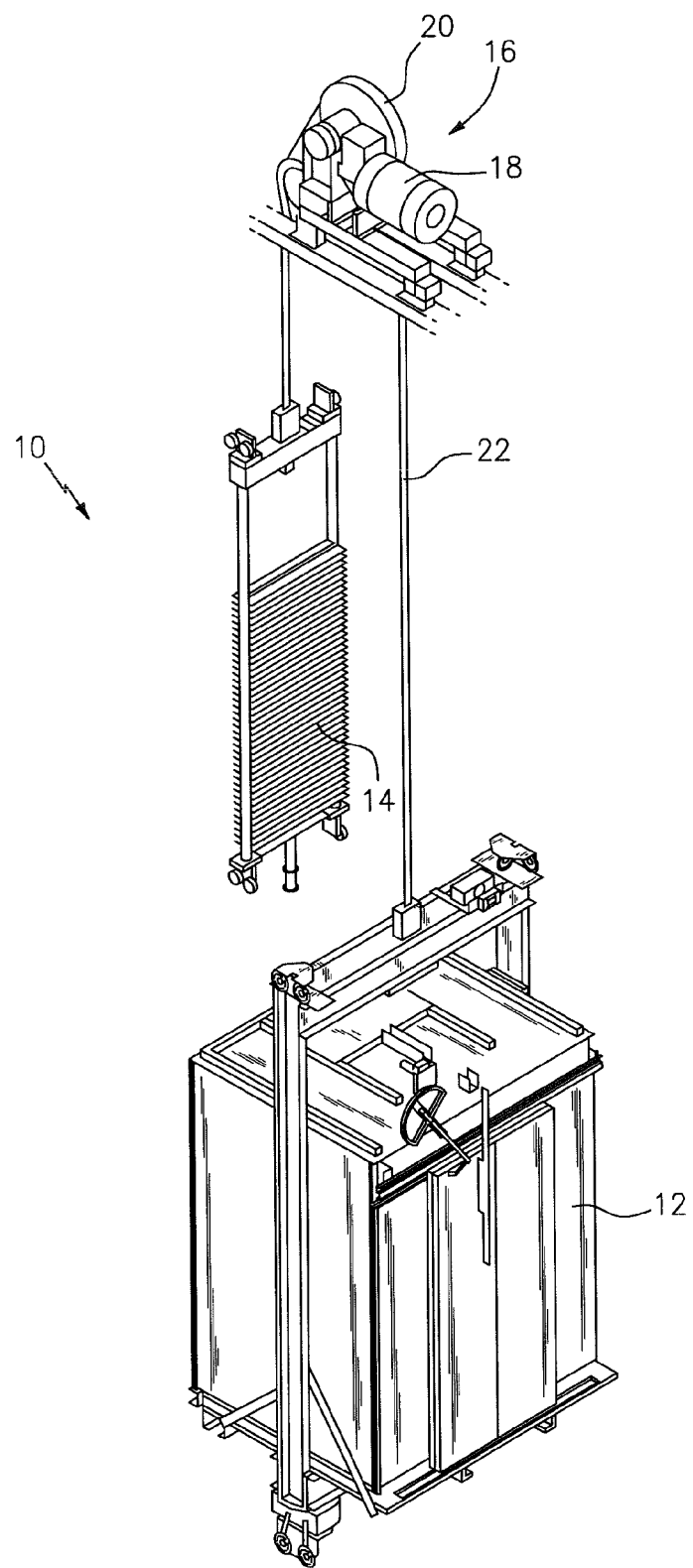
FIG. 1 is an illustration of a traction elevator system.

FIG. 1 illustrates an exemplary traction elevator system 10 that could utilize the present invention. The elevator system 10 includes a car 12, a counterweight 14, a traction drive 16 including a machine 18 and a traction sheave 20, and a belt 22. The traction drive 16 moves the belt 22 interconnecting the car 12 and counterweight 14 using the traction sheave 20. The belt 22 is engaged with the sheave 20 such that rotation of the sheave 20 moves the belt 22, and thereby the car 12 and the counterweight 14. Although FIG. 1 shows an elevator system with a 1:1 roping arrangement, other elevator systems (e.g. with a 2:1 roping arrangement, etc.) could be used.

FIGS. 2-5 illustrate several possible embodiments of the belt 22. In each embodiment, the belt 22 is defined by a length extending along an x-axis, a width extending along a y-axis, and height extending along a z-axis. FIGS. 2-5 each illustrate the y-axis and the z-axis. In FIGS. 2-5, the x-axis extends into and out of the page. The belt 22 includes a plurality of lengthwise-extending tension members 24 covered by a jacket 26. The tension members 24 are the primary tensile load bearing structure of the belt 22. In some embodiments, the jacket 26 does not support the weight of the elevator car 12 or counterweight 14 at all. However, even in such embodiments, the jacket 26 does form part of the load path; i.e., the jacket 26 transmits traction forces between the traction sheave 20 and the belt 22 to the tension members 24. The tensions members 24 can be arranged generally parallel to each other. In each of FIGS. 2-5, the belt 22 is shown to have four tension members 24. In other embodiments, the belt 22 may have more than four tension members 24 or less than four tension members 24. The jacket 26 substantially retains the tension members 24 in a desired position and orientation relative to each other. The phrase "substantially retain" means that the jacket 26 sufficiently engages the tension members 24 such that the tension members 24 do not pull out of the jacket 26 and remain substantially stationary relative to the jacket 26 during use (e.g., when the belt 22 is subject to a load encountered during use of the elevator system 10). In some embodiments, the jacket 26 completely covers the tension members 24. In other embodiments, the jacket 26 may only partially cover the tension members 24.

The tension members 24 can be wound steel cord. The tension members 24 are not limited to wound steel cords, however, and may alternatively be any other material or structure operable to bear a load in a traction elevator system. In the embodiments of FIGS. 2-5, the jacket 26 includes a thermoplastic material and at least one fire-retardant material. The thermoplastic material is not limited to any particular material; the thermoplastic material may, for example, be a thermoplastic elastomer, a thermoplastic vulcanizate, a thermoplastic polyurethane, or another thermoplastic material. The fire-retardant material is not limited to any particular material. As used herein, the phrase "fire-retardant" of "fire retardant" means inhibiting or resisting or slowing the spread of fire. Fire-retardant materials may include one or a combination of the following: phosphorus-based materials; halogenated materials (e.g., bromines, chlorines, fluorines, etc.); intumescent systems (which typically include an acid source, a carbonizing or char-forming agent, and a blowing agent); silicon-based materials; nitrogen-based materials (e.g., melamine compounds); polymers having a nanoscale filler chemically bonded to a matrix phase; nanocomposite materials (e.g., nanoclays, carbon nanotubes, metallic oxides, etc.); the materials described in International Application Nos. PCT/US2008/073236 and PCT/US2011/55940, which are incorporated herein by reference; or other materials. Although the jacket 26 need not include any particular thermoplastic materials or any particular fire-retardant materials, it may be preferred that the selected materials, when combined, not interfere with or adversely change the others' respective properties. For example, it may be important that the fire-retardant material not inhibit the flexibility or moldability of the thermoplastic material. The jacket need not include a thermoplastic material. In alternative embodiments, the jacket may include a plurality of fibers (e.g., yarn), and the fibers may be woven about the tension members. In such embodiments, the fibers themselves may have fire-retardant properties, or fire-retardant materials may be applied to the fibers. Jackets including woven fibers are known in the art, and will not be discussed further herein. In alternative embodiments, the jacket may include thermosetting rubbers, such as thermosetting vulcanizate.

Figure 2:
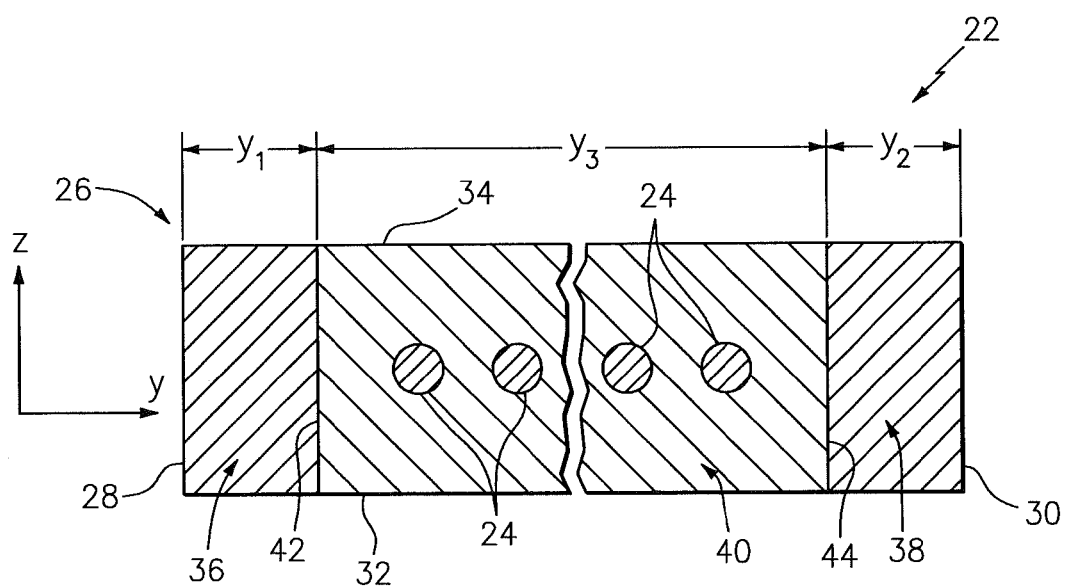
FIG. 2 is a sectional view of one embodiment of a belt.
Figure 3:
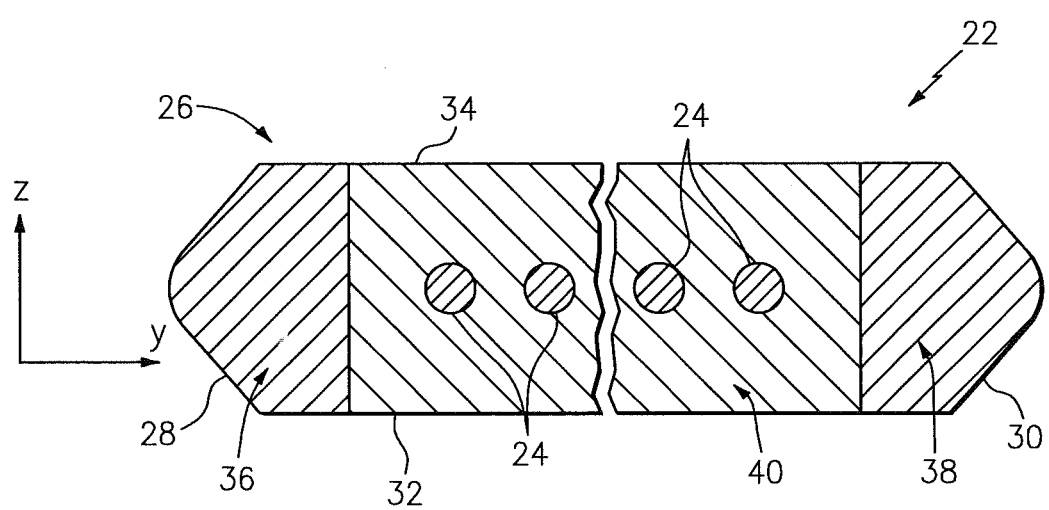
FIG. 3 is a sectional view of one embodiment of a belt.
Figure 4:
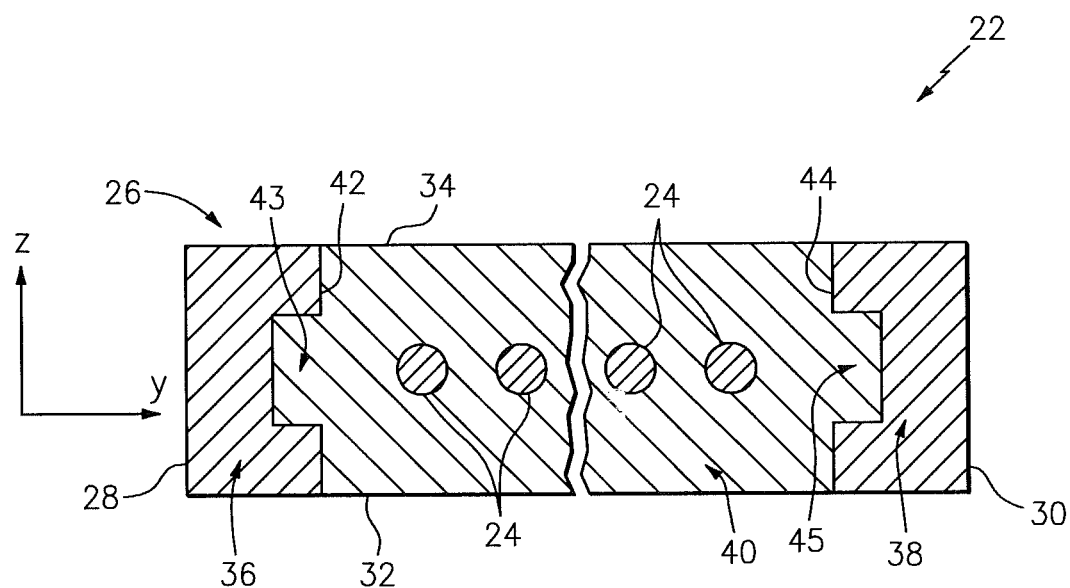
FIG. 4 is a sectional view of one embodiment of a belt.
Figure 5:
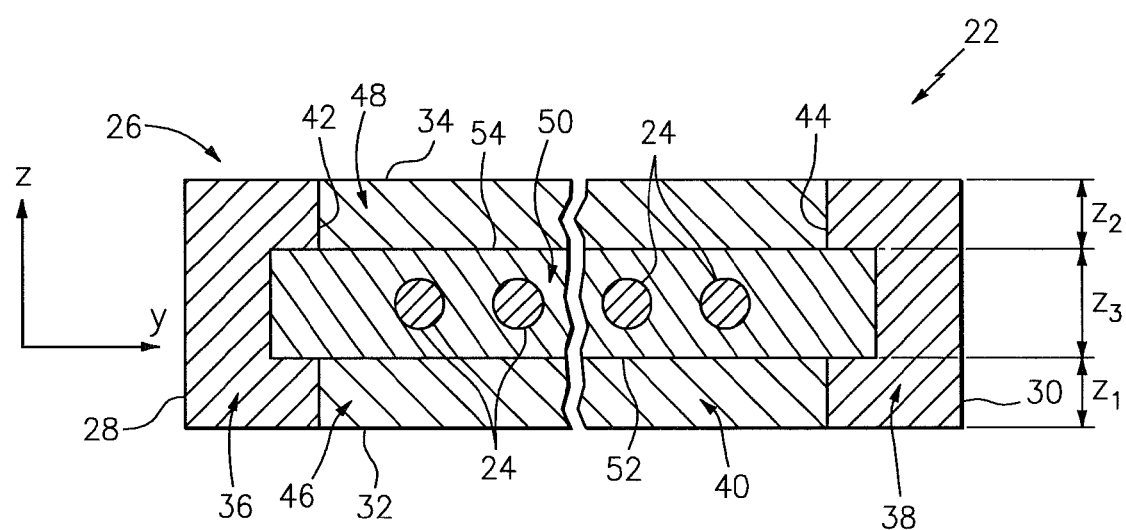
FIG. 5 is a sectional view of one embodiment of a belt.

Referring to the embodiments illustrated in FIGS. 2-5, the jacket 26 includes a first side surface 28, a second side surface 30, a first traction surface 32, and a second traction surface 34. The first and second side surfaces 28, 30 oppose one another, and the first and second traction surfaces 32, 34 oppose one another. The first and second traction surfaces 32, 34 (i.e., the wide side surfaces of the belt 22) extend in a direction between the first and second side surfaces 28, 30 (i.e., the narrow side surfaces of the belt). In the embodiments of FIGS. 2, 4 and 5, the first and second side surfaces 28, 30 and the first and second traction surfaces 32, 34 are substantially planar and define a sectional view rectangular geometry having blunt edges. In alternative embodiments, however, one or more of the first and second side surfaces and the first and second traction surfaces may be non-planar. For example, FIG. 3 illustrates an embodiment of the belt 22 in which the first and second side surfaces 28, 30 of the jacket 26 are arcuate. In other embodiments, one or more of the first and second side surfaces and the first and second traction surfaces may have a sawtooth shape, a "V" shape, or another shape. Referring to FIG. 2, the first and second side surfaces 28, 30 are separated from one another by a widthwise distance, and the first and second traction surfaces 32, 34 are separate from one another by a heightwise distance. In the embodiment illustrated in FIGS. 2, the sectional view geometry of the jacket 26 is the same throughout the belt 22; i.e., any given section of the jacket 26 will have a geometry that is identical to that illustrated in the sectional view of FIG. 2. In alternative embodiments, there may be some change in the sectional view geometry of the jacket. In some embodiments, a widthwise distance between the side surfaces of the jacket is greater than a heightwise distance between the traction surfaces of the jacket.

In the embodiments illustrated in FIGS. 2-5, the jacket 26 further includes a first side region 36 contiguous with the first side surface 28, a second side region 38 contiguous with the second side surface 30, and a center region 40 extending in a direction between the first and second side regions 36, 38. The first and second side regions 36, 38 are more fire retardant that the center region 40. In some embodiments, the enhanced fire-retardant properties in the first and second side regions 36, 38 are achieved by providing additional and/or different fire-retardant materials, and/or higher concentrations (e.g., higher weight per volume) of fire-retardant materials, in the first and second side regions 36, 38 relative to the center region 40. In some embodiments, for example, the first and second side regions 36, 38 have at least 5% higher weight per volume of fire-retardant materials relative to the center region 40. In other embodiments, difference in concentration of fire-retardant material between the first and second side regions 36, 38 and the center region 40 may be greater or less than 5%. In other embodiments, the center region 40 may have no fire-retardant properties, and thus the fire-retardant properties in the first and second side regions 36, 38 are enhanced relative to the center region 40 simply by providing fire-retardant materials in the first and second side regions 36, 38. In still other embodiments, the enhanced fire-retardant properties in the first and second side regions 36, 38 are achieved by selecting a particular sectional view geometry for the first and second side regions 36, 38. The particular end geometry for the first and second side regions 36, 38 may be selected to exploit that fact that fire spreads more slowly along broad, flat surfaces than along, for example, narrow edge surfaces or corners. The configurations and compositions of the several regions of the jacket 26 will be discussed further below. It is noted that in all of the drawings, the tension members 24 are shown to be encased within the center region 40 of the jacket 26 only. In alternative embodiments not shown in the drawings, the first and/or second side regions of the jacket may encase one or more the tension members.

In the embodiment illustrated in FIG. 2, each of the first and second side regions 36, 38, when viewed from a sectional view, have a rectangular geometry. The first side region 36 is defined by the first side surface 28, the first and second traction surfaces 32, 34, and a first side region boundary 42 that extends in a direction between the first and second traction surfaces 32, 34. In the embodiment illustrated in FIG. 2, the first side region boundary 42 is substantially planar and extends in a direction perpendicular to the first and second traction surfaces 32, 34. The second side region 38 is defined by the second side surface 30, the first and second traction surfaces 32, 34, and a second region boundary 44 that extends in a direction between the first and second traction surfaces 32, 34. In the embodiment illustrated in FIG. 2, the second region boundary 44 is substantially planar and extends in a direction perpendicular to the first and second traction surfaces 32, 34. In the embodiment illustrated in FIG. 2, the first side region 36 is further defined by a widthwise distance (identified in FIG. 2 as "$y_1$") equal to the distance between the first side surface 28 and the first side region boundary 42, and the second side region 38 is further defined by a widthwise distance (identified in FIG. 2 as "$y_2$") equal to the distance between the second side surface 30 and the second side region boundary 44. In the embodiment illustrated in FIG. 2, because the first and second side regions 36, 38 have rectangular geometries, the first and second side regions 36, 38 are each defined by only one widthwise distance. That is, in the embodiment illustrated in FIG. 2, all widthwise distances between the first side surface 28 and the first side region boundary 42 are the same, and all widthwise distances between the second side surface 30 and the second side region boundary 44 are the same. In alternative embodiments (e.g., the embodiments illustrated in FIGS. 4 and 5), the first and second side regions 36, 38 may not have rectangular geometries, and thus each may be defined by more than one widthwise distance. In the embodiment illustrated in FIG. 2, the first and second regions 36, 38 each have heightwise distance equal to the distance between the first and second traction surfaces 32, 34. The center region 40 is defined by a widthwise distance (identified in FIG. 2 as "$y_3$") equal to the distance between the first side region boundary 42 and the second side region boundary 44. In the embodiment illustrated in FIG. 2, the combined widthwise distances of the first and second regions 36, 38 and the widthwise distance of the center region 40 equals the widthwise distance of the jacket 26.

The first and second regions 36, 38 of the jacket 26 are not limited to any particular sectional view geometry. In some alternative embodiments, the first and second side regions 36, 38 have sectional view geometries that are not rectangular. For example, in the embodiment illustrated in FIG. 3, in which the first and second side surfaces 28, 30 of the jacket 26 are arcuate, the first and second side regions 36, 38 of the jacket 26 each have a non-rectangular geometry. By rounding the first and second side surfaces 28, 30, the fire-retardant properties of the first and second side regions 36, 38 may be enhanced relative to the center region 40. In such embodiments, the first and second side regions 36, 38 may be made from the same material as the center region 40; i.e., in such embodiments, it may be unnecessary to provide, for example, additional and/or different fire-retardant materials, and/or higher concentrations of fire-retardant materials, in the first and second side regions 36, 38 relative to the center region 40. In the embodiment illustrated in FIG. 4, the first and second side regions 36, 38, when viewed from an sectional view, have a "C" shaped geometry and "reverse C" shaped geometry, respectively. As indicated above, in the embodiment illustrated in FIG. 4, the first and second side regions 36, 38 are each defined by more than one widthwise distance. In the embodiment illustrated in FIG. 4, the first and second side regions 36, 38 are configured essentially the same as they are in the embodiment illustrated in FIG. 2, except the first side region boundary 42 and the second side region boundary 44 are not substantially planar. The first side region boundary 42 defines a recess 43 that extends into the first side region 36, and the second side region boundary 44 defines a recess 45 that extends into the second side region 38. By providing first and second side regions that include recesses as shown in FIG. 4, a smaller amount of fire-retardant material may be used compared to embodiments similar to that shown in FIG. 2, while still achieve the same results as embodiments similar to that shown in FIG. 2. This is because the volume of the first and second side regions may be smaller compared to embodiments similar to that shown in FIG. 2.

In the embodiments illustrated in FIGS. 2-4, the center region 40 is one continuous region of the jacket 26. In alternative embodiments, the center region is subdivided into several sub-regions. For example, in the embodiment illustrated in FIG. 5, the center region 40 is subdivided into a first traction sub-region 46, a second traction sub-region 48, and a core sub-region 50. The first traction sub-region 46 is defined by the first traction surface 32, the first side region boundary 42, the second side region boundary 44, and the first traction sub-region boundary 52. The second traction sub-region 48 is defined by the second traction surface 34, the first side region boundary 42, the second side region boundary 44, and the second traction sub-region boundary 54. In the embodiment illustrated in FIG. 5, each of the first and second traction sub-region boundaries 52, 54 are substantially planar and extend perpendicular to the first and second side region boundaries 42, 44. The first traction sub-region 46 is defined by a heightwise distance (identified in FIG. 5 as "$z_1$") equal to the distance between the first traction surface 32 and the first traction sub-region boundary 52, and the second traction sub-region 48 is defined by a heightwise distance (identified in FIG. 5 as "$z_2$") equal to the distance between the second traction surface 34 and the second traction sub-region boundary 54. The first and second traction sub-region boundaries need not be substantially planar; in alternative embodiments, the first and second traction sub-region boundaries may be at least partially arcuate, or another shape. The core sub-region 50 is defined by the first and second side region boundaries 42, 44, and the first and second traction sub-region boundaries 52, 54. The core sub-region 50 is defined by a heightwise distance (identified in FIG. 5 as "$z_3$") equal to the distance between the first and second traction sub-region boundaries 52, 54. The combined heightwise distances of the first and second traction sub-regions 46, 48 and the heightwise distance of the core sub-region 50 equals the distance between the first and second traction surfaces 32, 34. In the embodiment illustrated in FIG. 5, each of the first and second traction sub-regions 46, 48 and the core sub-region 50 can have a rectangular geometry when viewed from an sectional view. In alternative embodiments, each of the several sub-regions of the center region of the jacket may have non-rectangular geometries. In the embodiment illustrated in FIG. 5, the tension members 24 are shown to be encased within the core sub-region 50 of the center region 40 of the jacket 26. In alternative embodiments not shown in the drawings, one or more of the tension members may alternatively or additionally be encased within one or more of the first and second traction sub-regions of the center region of the jacket.

In embodiments in which the center region of the jacket is subdivided into several sub-regions, each of the several sub-regions may have different properties and/or a different composition with respect to one another. For example, in the embodiment illustrated in FIG. 5, the first and second traction sub-regions 46, 48 of the jacket 26 each have a composition that makes them suitable for engaging a traction sheave during use of the traction elevator system; e.g., each of the sub-regions 46, 48 may have a desired coefficient of friction. In contrast, the core sub-region 50 of the jacket 26 has a composition that makes it fire-retardant (though less fire-retardant than the first and second side regions 36, 38 of the jacket 26, as discussed above). In alternative embodiments, the properties and/or compositions of the several sub-regions of the jacket may vary, and may be selected to make the jacket suitable for a particular use.

The belt 22 illustrated in FIG. 2 may, for example, be manufactured by extruding the jacket 26 onto the plurality of tension members 24. In such manufacturing methods, a thermoplastic material and a fire-retardant material can be provided to a jacket material mixer. The jacket material mixer can output a first mixed jacket material and a second mixed jacket material. The first mixed jacket material can include a higher concentration (e.g., higher weight per volume) of the fire-retardant material than the second mixed jacket material, and thus the first mixed jacket material is more fire-retardant than the second mixed jacket material. The first and second mixed jacket materials can be fed from the jacket material mixer to a jacket forming device. A plurality of spools can supply the tension members 24 to the jacket forming device. As the tension members 24 are fed through the jacket forming device, the first and second mixed jacket materials can be molded onto exterior surfaces of the tension members 24 resulting in the belt illustrated in FIG. 2. The jacket forming device can include a molding device to provide the desired geometries of the jacket 26; e.g., the desired geometries of the first and second side regions 36, 38, and the desired geometry of the center region 40. The jacket forming device can be configured so that first mixed jacket material (i.e., the more fire-retardant material) is used to form the first and second side regions 36, 38 of the jacket 26, and the second mixed jacket material (i.e., the less fire-retardant material) is used to form the center region 40 of the jacket 26. Similar manufacturing steps may be used to manufacture the embodiments illustrated in FIGS. 3-5.

The belt of the present invention need not be manufactured according to the extrusion method described above; the above-described manufacturing method is for illustrative purposes only. In another example of an acceptable method for manufacturing the belt of the present invention, fire-retardant material may be incorporated into the assembly without being mixed directly into the jacket material. In such methods, the fire-retardant material may be incorporated into the jacket by inserting the fire-retardant material into voids in a preformed jacket. Such methods are known in the art and are described, for example, in U.S. Pat. No. 6,739,433, which is hereby incorporated by reference. Such methods will not be described further herein. As another alternative, a mold wheel or other molding method could be used to manufacture the present invention.

As indicated above, not all embodiments of the jacket include a thermoplastic material. In some alternative embodiments, the jacket includes a plurality of fibers that are woven about the plurality of tension members to form the belt. Methods for weaving fibers about a plurality of tension members are known in the art and will not be discussed in detail herein. The methods described above may be used to adapt known methods for weaving fibers about a plurality of tension members so that first and second side regions of a fiber-woven jacket are more fire-retardant than a center region of the jacket.

While various embodiments of the present invention have been disclosed, it will be apparent to those of ordinary skill in the art that many more embodiments and implementations are possible within the scope of the invention. Accordingly, the present invention is not to be restricted except in light of the attached claims and their equivalents.

What is claimed is:

1. A belt, comprising:
a plurality of lengthwise-extending tension members; and
a jacket substantially retaining the plurality of tension members, the jacket having a first side region, a second side region, and a center region between the first and second side regions;
wherein the first and second side regions of the jacket are more fire retardant than the center region of the jacket, and
wherein the jacket includes one or more woven fibers.

2. The belt of claim 1, the jacket further comprising a first side surface opposing a second side surface, the first and second side surfaces extending between a first traction surface and a second traction surface.

3. The belt of claim 2, wherein a widthwise distance between the first and second side surfaces is greater than a heightwise distance between the first and second traction surfaces.

4. The belt of claim 3, wherein the first side region is contiguous with the first side surface, and the second side region is contiguous with the second side surface.

5. The belt of claim 1, wherein the first and second side regions of the jacket have a higher concentration of a fire-retardant material than the center region.

6. The belt of claim 1, wherein the first and second side regions of the jacket each include a first fire-retardant material and the center region of the jacket includes a second fire-retardant material, and wherein the first fire-retardant material is more fire retardant than the second fire-retardant material.

7. The belt of claim 1, wherein the first and second side regions of the jacket include a greater amount of a fire-retardant material than the center region of the jacket.

8. The belt of claim 4, wherein the first side region is defined by the first side surface, the first and second traction surfaces, and a first side region boundary that extends between the first and second traction surfaces.

9. The belt of claim 8, wherein the first side region is defined by a widthwise distance between the first side surface and the first side region boundary.

10. The belt of claim 8, wherein the first side region is defined by a plurality of widthwise distances between the first side surface and the first side region boundary.

11. The belt of claim 4, wherein the second side region is defined by the second side surface, the first and second traction surfaces, and a second region boundary that extends between the first and second traction surfaces.

12. The belt of claim 11, wherein the second side region is defined by a widthwise distance between the second side surface and the second side region boundary.

13. The belt of claim 11, wherein the second side region is defined by a plurality of widthwise distances between the second side surface and the second side region boundary.

14. The belt of claim 1, wherein the one or more woven fibers of the jacket have fire-retardant properties.

15. The belt of claim 1, wherein a fire-retardant material is applied to the one or more woven fibers of the jacket.

16. The belt of claim 1, wherein the jacket defines at least one blunt edge.

17. The belt of claim 1, wherein the jacket is at least partially arcuately shaped.

* * * * *